United States Patent
Sano et al.

(10) Patent No.: US 8,241,192 B2
(45) Date of Patent: Aug. 14, 2012

(54) SHEET OR FILM-FORMING ROLL

(75) Inventors: Takayoshi Sano, Fuji (JP); Tadamasa Furuya, Sunto-Gun (JP); Takehiro Yamamoto, Shizuoka (JP); Satoru Nitta, Numazu (JP); Koji Mizunuma, Sunto-Gun (JP); Takashi Hirose, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/877,720

(22) Filed: Sep. 8, 2010

(65) Prior Publication Data

US 2011/0003672 A1    Jan. 6, 2011

Related U.S. Application Data

(62) Division of application No. 11/534,339, filed on Sep. 22, 2006, now Pat. No. 7,811,218.

(30) Foreign Application Priority Data

Sep. 22, 2005  (JP) ................. 2005-275602
Dec. 27, 2005  (JP) ................. 2005-376468

(51) Int. Cl.
*F16C 13/00* (2006.01)

(52) U.S. Cl. .................... 492/15; 492/27; 492/47

(58) Field of Classification Search ............ 492/15, 492/1, 27, 47
See application file for complete search history.

(56) References Cited

U.S. PATENT DOCUMENTS

| | | | |
|---|---|---|---|
| 3,470,948 A | 10/1969 | Korsch | |
| 3,490,119 A | 1/1970 | Fukuyama et al. | |
| 3,747,181 A | 7/1973 | Nykopp et al. | |
| 4,068,360 A | 1/1978 | Freuler et al. | |
| 4,071,081 A | 1/1978 | Chielens et al. | |
| 4,233,011 A | 11/1980 | Bolender et al. | |
| 4,440,214 A | 4/1984 | Wedel | |

(Continued)

FOREIGN PATENT DOCUMENTS

CN    1834567    9/2006
(Continued)

OTHER PUBLICATIONS

German Office Action issued in Application No. 102006044463.9-16 mailed Jan. 24, 2008.

(Continued)

*Primary Examiner* — Essama Omgba
(74) *Attorney, Agent, or Firm* — DLA Piper LLP (US)

(57) ABSTRACT

A sheet or film-forming roll 10 includes an inner cylinder member 20 having axial parts 21, 22 provided on both sides thereof and rotatably supported by bearing parts 26, 27 through the axial parts 21, 22, a rubber roll 40 fitted to an outer circumferential surface of the inner cylinder member 20, eccentric side plates 53, 54 rotatably fitted to the axial parts 21, 22 of the inner cylinder member 20 respectively, and an elastic outer cylinder member 50 rotatably supported by the eccentric side plates 53, 54. The elastic outer cylinder member 50, which is provided with a thin-walled structure and made from metal, has an inner diameter larger than an outer diameter of the rubber roll 40 to accommodate the rubber roll 40 in an interior 68 thereof, and has inner circumferential surface 50A coming into contact with an outer circumferential surface 40A of the rubber roll 40.

3 Claims, 10 Drawing Sheets

U.S. PATENT DOCUMENTS

| | | | |
|---|---|---|---|
| 4,823,450 | A | 4/1989 | Ramisch et al. |
| 5,060,357 | A | 10/1991 | Roerig et al. |
| 5,188,273 | A | 2/1993 | Schmoock |
| 5,567,448 | A | 10/1996 | Frankland |
| 5,943,895 | A | 8/1999 | Lemper |
| 5,945,042 | A | 8/1999 | Mimura |
| 5,984,568 | A | 11/1999 | Lohbeck |
| 5,984,658 | A | 11/1999 | Shimizu |
| 6,129,017 | A | 10/2000 | Mohrmann et al. |
| 6,221,301 | B1 | 4/2001 | Tsunashima |
| 6,568,931 | B2 | 5/2003 | Fujii |
| 7,367,794 | B2 | 5/2008 | Sano |
| 7,811,218 | B2 | 10/2010 | Sano |
| 7,824,320 | B2 * | 11/2010 | Kerschbaumer et al. ......... 492/1 |
| 7,846,367 | B2 * | 12/2010 | Sano et al. ................. 264/299 |
| 7,850,587 | B2 * | 12/2010 | Sano .............................. 492/6 |
| 7,963,037 | B2 * | 6/2011 | Garben ...................... 29/895.2 |
| 2004/0113316 | A1 | 6/2004 | Fuji et al. |
| 2006/0211556 | A1 | 9/2006 | Sano |
| 2007/0052118 | A1 | 3/2007 | Kudo et al. |
| 2007/0063376 | A1 | 3/2007 | Sano et al. |
| 2009/0297777 | A1 | 12/2009 | Sano et al. |
| 2010/0119639 | A1 | 5/2010 | Sano et al. |

FOREIGN PATENT DOCUMENTS

| | | |
|---|---|---|
| CN | 1928648 | 3/2007 |
| DE | 1251188 | 9/1967 |
| DE | 1575524 | 1/1970 |
| DE | 69731321 | 10/2005 |
| DE | 102006012398 | 9/2006 |
| DE | 102006044463 | 5/2007 |
| JP | H 03-227858 | 10/1991 |
| JP | 4-164741 | 6/1992 |
| JP | H 10-217314 | 8/1998 |
| JP | 10-315304 | 12/1998 |
| JP | 11-207817 | 8/1999 |
| JP | H11-235747 | 8/1999 |
| JP | H 11-314263 | 11/1999 |
| JP | 2000-506795 | 6/2000 |
| JP | 2000-239409 | 9/2000 |
| JP | 3194904 | 8/2001 |
| JP | 2002-036332 | 2/2002 |
| JP | 3422798 | 6/2003 |
| JP | 2005-138509 | 6/2005 |
| JP | 2006-256159 | 9/2006 |
| JP | 2007-083577 | 4/2007 |
| KR | 10-0671216 | 1/2007 |
| KR | 2007-26264 | 3/2007 |
| TW | 019205 | 9/1975 |
| TW | 189464 | 8/1992 |
| TW | 194705 | 11/1992 |
| TW | 324686 | 1/1998 |
| TW | 496797 | 8/2002 |
| TW | 2007 14452 | 4/2007 |
| TW | 2007 16356 | 5/2007 |
| WO | WO 97/34754 A1 | 9/1997 |

OTHER PUBLICATIONS

English translation of German Office Action issued in. Application No. 102006044463.9-16 mailed Jan. 24, 2008.
English translation of DE 1 251 188, published Sep. 28, 1967.
Taiwan IPO Search Report issued in Application No. 095134908 mailed Jul. 30, 2008.
English language abstract of Taiwan IPO Search Report issued in Application No. 095134908 mailed Jul. 30, 2008.
English language translation of TW189464 published Aug. 21, 1992.
English language abstract of TW019205 published Sep. 1, 1975.
Machine English language translation of JP 11-207817 published Aug. 3, 1999.
English language abstract of JP 04-164741 published Jun. 10, 1992.
English language abstract of JP 11-207817 published Aug. 3, 1999.
Office Action issued in Japanese Application No. 2005-275602, dated Feb. 10, 2009.
English language translation of Office Action issued in Japanese Application No. 2005-275602, dated Feb. 10, 2009.
English language abstract of International Application No. WO 97/28950, which was also published as JP 3422798.
English language abstract of JP 11-235747 published Aug. 31, 1999.
Korean Office Action mailed Sep. 18, 2007; Application No. 10-2006-133621.
English translation of Korean Abstract published under Korean Publication No. 10-0671216.
German Office Action issued in Application No. 10 2006 061040.7-16 mailed Mar. 19, 2008.
English Translation of German Office Action issued in Application No. 10 2006 061040.7-16 mailed Mar. 19, 2008.
Chinese Office Action issued in Application No. 200610156230.2 dated Oct. 31, 2008.
English language translation of Office Action issued Chinese Application No. 200610156230.2 dated Oct. 31, 2008.
English Language Machine Translation of JP 2002-036332 published Feb. 5, 2002.
English Language Abstract of JP 2002-036332 published Feb. 5, 2002.
English Language Machine Translation of JP 3422798 published Jun. 30, 2003.
English Language Machine Translation of JP 2000-506795 published Jun. 6, 2000.
Notice of Allowance in Taiwan application No. 0951490256, issued on Jun. 25, 2009.
English Language Abstract of JP 2005-138509 published Jun. 2, 2005.
English Language Machine Translation of JP 2005-138509 published Jun. 2, 2005.
Search Report in Taiwan application No. 095149026, issued on Jun. 25, 2009.
English translation of search report in Taiwan application No. 095149026, issued on Jun. 25, 2009.
English Language Abstract of JP 3422798 published Jun. 30, 2003.
English Language Translation of TW 496797 published Aug. 1, 2002.
English Language Abstract of JP 2000-506795 published Jun. 6, 2000.
English Language Abstract of DE 69731321 published Oct. 20, 2005.
English Language Machine Translation of JP 11-235747 published Aug. 31, 1999.
English Language Machine Translation of JP 10-315304.
Korean Office Action mailed Oct. 21, 2009 in Application No. 10-2008-47783.
English Language Abstract of KR 2007-26264 published Mar. 8, 2007.
Partial English Language translation for Korean Office Action mailed Oct. 21, 2009 in Application No. 10-2008-47783.
English abstract of JP-2006-256159 published Sep. 26, 2006.
Machine English language translation of JP-2006-256159 published Sep. 26, 2006.
Notice of Allowance issued in counterpart Taiwan Application No. 096147234 on Jan. 26, 2010.
Search Report issued in counterpart Taiwan Application No. 096147234 on Jan. 26, 2010.
English abstract of CN1834567A issued on Sep. 20, 2006.
Machine English language translation of JP 3194904B2 issued on Aug. 6, 2001.
English abstract of TW324686 issued on Jan. 11, 1998.
Office Action issued in JP 2005-376468 on Apr. 13, 2010.
English Language Translation of Office Action issued in JP 2005-376468 on Apr. 13, 2010.
Office Action issued in JP 2005-376029 on Apr. 13, 2010.
English Language Translation of Office Action issued in JP 2005-376029 on Apr. 13, 2010.
English Language Abstract of JP 2000-239409 published Sep. 5, 2000.
English machine language translation of JP 2000-239409 published Sep. 5, 2000.
English Language Abstract of JP H 10-217314 published Aug. 18, 1998.
English machine language translation of JP H 10-217314 published Aug. 18, 1998.

English Language Abstract of JP 2007-083577 published Apr. 5, 2007.
English machine language translation of JP 2007-083577 published Apr. 5, 2007.
English Language Abstract of JP H 11-314263 published Nov. 16, 1999.
English machine language translation of JP H 11-314263 published Nov. 16, 1999.
Related U.S. Appl. No. 11/614,223 as of Sep. 8, 2010.
Related U.S. Appl. No. 12/473,579 as of Sep. 8, 2010.
Related U.S. Appl. No. 12/518,511 as of Sep. 8, 2010.
Related U.S. Appl. No. 11/534,339 as of Sep. 8, 2010.
English Language Abstract of JP 3-227858 published Oct. 8, 1991.
International Search Report issued in PCT/JP2007/073797 published Feb. 5, 2008.
English Language Machine Translation of JP 2000-506795.
English abstract of JP-10-315304 published Dec. 2, 1998.
Office Action issued in Chinese Appl 200810109176.5 on Mar. 8, 2010.
English Language Translation of Office Action issued in Chinese Appl 200810109176.5 on Mar. 8, 2010.
Decision of Refusal issued in Chinese Appln. 200810109176.5 on Nov. 9, 2010.
English Translation of Decision of Refusal issued in Chinese Appln. 200810109176.5 on Nov. 9, 2010.
English Language Abstract of CN 1928648 published Mar. 14, 2007.
Office Action issued in TW97119277 on Dec. 3, 2010.
English Language Translation of Office Action issued in TW97119277 on Dec. 3, 2010.
English Language Abstract of TW200716356 published May 1, 2006.
English Language Abstract of TW200714452 published on Apr. 16, 2007.
Related U.S. Appl. No. 11/614,223 from Sep. 10, 2010 to Jun. 13, 2011.
Related U.S. Appl. No. 12/473,579 from Sep. 10, 2010 to Jun. 13, 2011.
Related U.S. Appl. No. 11/534,339 from Sep. 10, 2010 to Jun. 13, 2011.
Korean Office Action issued in KR Appl. No. 10-2009-46397 on Nov. 19, 2010.
Partial English Language Translation of Korean Office Action issued in KR Appl. No. 10-2009-46397 on Nov. 19, 2010.
Chinese Office Action issued in CN 200810109176.5 on May 25, 2011.
English Language Translation of Chinese Office Action issued in CN 200810109176.5 on May 25, 2011.
Related U.S. Appl. No. 12/473,607 electronically captured on Mar. 23, 2012.
Related U.S. Appl. No. 12/126,202 electronically captured on Mar. 23, 2012.
Related U.S. Appl. No. 12/518,511 electronically captured on Mar. 23, 2012.
Related U.S. Appl. No. 12/473,579 electronically captured on Mar. 23, 2012.
Chinese Office Action issued in CN 2008-10109176.5 on Nov. 15, 2011.
English Language Translation of Chinese of Action issued in CN 2008-10109176.5 on Nov. 15, 2011.
Related U.S. Appl. No. 12/518,511 electronically captured on Jun. 22, 2012 between Apr. 4, 2012 to Jun. 22, 2012.
Related U.S. Appl. 12/473,607 electronically captured from PAIR on Jun. 22, 2012 betWeen Mar. 22, 2012 to Jun. 22, 2012.

* cited by examiner

SHEET OR FILM-FORMING ROLL

CROSS-REFERENCE TO RELATED APPLICATIONS

This application is a divisional of U.S. application Ser. No. 11/534,339 filed Sep. 22, 2006, now U.S. Pat. No. 7,811,218 issued on Oct. 12, 2010. U.S. application Ser. No. 11/534,339 claims priority to Japanese Patent Application No. 2005-275602 filed Sep. 22, 2005 and Japanese Patent Application No. 2005-376468 filed Dec. 27, 2005. The entire contents of all of the applications mentioned above are incorporated herein by reference.

BACKGROUND OF THE INVENTION

1. Field of the Invention

The present invention relates to a sheet or film-forming roll, and more particularly, relates to touch rolls suitable for forming of a thin sheet or film.

2. Description of the Related Art

There has been known a touch-roll type sheet or film-forming method for successively forming a sheet or film by supplying melting resin from a T-shaped die in an interval between a main roll and a sub roll (touch roll).

Japanese Patent Publication Laid-open No. 2002-36332 discloses a touch roll having a double structure of an outer cylinder and an inner cylinder. In the touch roll, the outer cylinder is formed with a thin-walled structure of metal, while a crowning is applied on an outer profile of the touch roll.

While, Japanese Patent Publication No. 3194904 discloses another touch roll having a double structure of an outer cylinder and an inner cylinder. In this touch roll, the outer cylinder is formed with a thin-walled structure of metal. Additionally, the outer cylinder is elastically deformed while following an outer circumferential surface of the main roll by an imposed load against the main roll.

Further, Japanese Patent Publication No. 3422798 discloses a touch roll that a thin-walled metallic outer cylinder is rotatably attached to an irrotational center support shaft concentrically, while a rubber roll is attached to the center support shaft in the thin-walled metallic outer cylinder, rotatably and eccentrically. In this touch roll, due to its eccentricity, an outer circumferential surface of the rubber roll abuts on an inner circumferential surface of the thin-walled metallic outer cylinder, so that rubber-like elasticity of the rubber roll has charge of an elastic deformation of the thin-walled metallic outer cylinder caused by its pressing load applied on a main roll (i.e. rubber roll's "inner pressure" supporting).

According to a sheet or film-forming roll employing such a "rubber-roll inscribing type" touch roll that performs the rubber roll's inner pressure supporting against the thin-walled metallic outer cylinder, it is possible to form a thin sheet or film in comparison with a sheet or film-forming roll employing a touch roll including a metallic outer cylinder provided with a thin-walled structure only, because the pressing load on the main roll allows the thin-walled metallic outer cylinder to be deformed elastically and appropriately while following the outer circumferential surface of the main roll.

However, in the sheet or film-forming roll employing such a "rubber-roll inscribing type" touch roll disclosed in Japanese Patent Publication No. 3422798, it has to operationally connect the thin-walled metallic outer cylinder with an electric motor in order to rotate the forming roll since the center support shaft is formed by an irrotational shaft. As a result, this makes it difficult to be used for an existing general sheet or film-forming apparatus because its driving system is complicated in structure.

SUMMARY OF THE INVENTION

Under the above-mentioned situation, it is an object of the present invention to provide a sheet or film-forming roll which is capable of rotating a forming roll without requiring such a complicated driving system and which can be used for the existing general sheet or film-forming apparatus.

In order to attain the above object, according to a first aspect of the present invention, there is provided a sheet or film-forming roll comprising: an inner cylinder member having a cylindrical part and axial parts extending along a center axis of the cylindrical part, the inner cylinder member being rotatably supported through the axial parts; a rubber roll fitted to an outer circumferential surface of the inner cylinder member; and an elastic outer cylinder member arranged eccentrically to the inner cylinder member so that an inner circumferential surface of the elastic outer cylinder member comes into contact with a part of the outer circumferential surface of the rubber roll, the elastic outer cylinder member being provided with a thin-walled structure and made from metal.

According to a second aspect of the present invention, there is also provided a sheet or film-forming roll comprising: an inner cylinder member having an elastic cylindrical body and axial parts extending along a center axis of the elastic cylindrical body, the inner cylinder member being rotatably supported through the axial parts; an elastic outer cylinder member arranged eccentrically to the inner cylinder member so that an inner circumferential surface of the elastic outer cylinder member comes into contact with a part of the outer circumferential surface of the inner cylinder member, the elastic outer cylinder member being provided with a thin-walled structure and made from metal; and a gear mechanism for transmitting rotating torque of the inner cylinder member to the elastic outer cylinder member when the inner cylinder member is rotated.

DETAILED DESCRIPTION OF THE PREFERRED EMBODIMENTS

Figure 1:
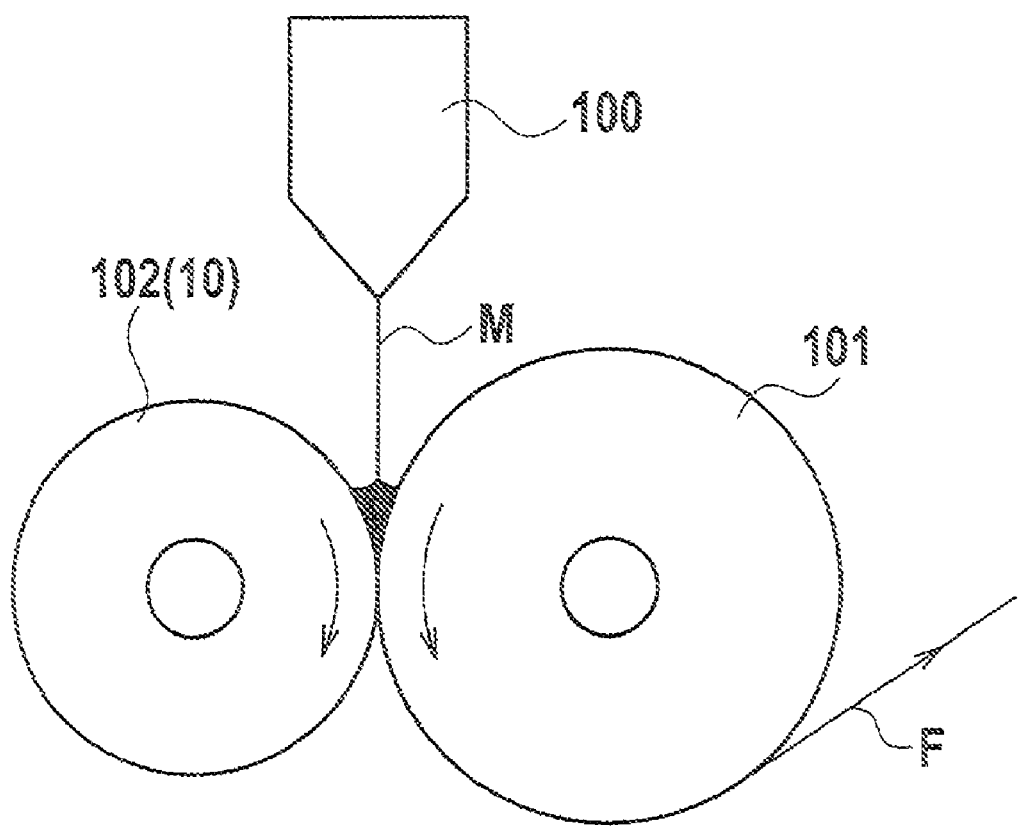
FIG. 1 is an explanatory view showing a summary of a sheet or film-forming method using sheet or film-forming rolls in accordance with the present invention.

Referring to FIG. 1, we first describe a sheet or film-forming method using a sheet or film-forming roll of the present invention, in brief. According to this sheet or film-forming method, molten resin "M" is supplied from a T-shaped die 100 into an interval between a main roll 101 and a sub roll (i.e. touch roll) 102 in pairs to produce a sheet or film "F" successively. The sheet or film-forming roll of the present invention is applied to the sub roll (touch roll) 102.

1st. Embodiment

A sheet or film-forming roll in accordance with the first embodiment of the present invention will be described with reference to FIGS. 2 to 5.

The sheet or film-forming roll 10 includes an inner cylinder member 20, a rubber roll 40 and a metallic elastic outer cylinder (elastic outer cylinder member) 50.

The inner cylinder member 20 comprises an axial member 21 on an operating side (left of FIGS. 2 and 3), an axial member 22 on a driving side (right of FIGS. 2 and 3) and a cylindrical member 25 fixed to flange parts 23, 24 which are formed integrally with respective ends of the axial members 21, 22, respectively. The axial members 21, 22 are arranged concentrically to each other. The cylindrical member 25 has its both ends welded to the flange parts 23, 24 respectively and is arranged concentrically to the axial members 21, 22.

In the inner cylinder member 20, the axial members (axial parts) 21, 22 are rotatably supported by an "operating-side" bearing part 26 and a "driving-side" bearing part 27, respectively. Thus, the inner cylinder member 20 can rotate about its own center axis. In other words, the operating-side bearing part 26 and the driving-side bearing part 27 rotatably support the axial members 21, 22 of the inner cylinder member 20 through bearing members 28, 29, respectively.

The axial member 22 on the driving side is operatively connected to a reduction machine 31 through a coupling 30. The reduction machine 31 is operatively connected to an electric motor 32. With this arrangement, the inner cylinder member 20 is operatively connected to the electric motor 32 through the intermediary of the reduction machine 31. Thus, the inner cylinder member 20 is driven in decelerative rotation by the electric motor 32.

The rubber roll 40 is made from rubber-like elastic material, for example, silicon rubber, ethylene-propylene rubber, etc. The rubber roll 40 is fitted in lamination to a whole outer circumferential surface of the cylindrical member 25 of the inner cylinder member 20. Due to this fitting in lamination, the rubber roll 40 rotates in integral with the inner cylinder member 20.

The axial members 21, 22 of the inner cylinder member 20 rotatably support disc-shaped eccentric side plates 53, 54 through ball bearings 51, 52, respectively. Respective centers "Cb" of the eccentric side plates 53, 54 are eccentrically positioned in relation to a center "Ca" of the inner cylinder member 20 by a shift length "e" (see FIG. 5).

The eccentric side plates 53, 54 rotatably support, at their outer circumferential parts, both ends of the metallic elastic outer cylinder 50 through ball bearings 55, 56, respectively. The metallic elastic outer cylinder 50 is in the form of a cylindrical body of sheet metal, such as stainless steel, exhibiting a thin-walled structure having flexibility. The metallic elastic outer cylinder 50 has an inner diameter "Rb" (see FIG. 4) thoroughly-larger than an outer diameter "Ra" of the rubber roll 40 and accommodates the rubber roll 40 in an interior 68 of the cylinder 50. Due to this eccentric arrangement of the outer cylinder 50 in relation to the rubber roll 40, an inner circumferential surface 50A of the outer cylinder 50 comes in contact with an outer circumferential surface 40A of the rubber roll 40 on a closer side (right of FIG. 4) of eccentricity.

Due to friction between respective contact portions of the rubber roll 40 and the metallic elastic outer cylinder 50, the rotation of both the inner cylinder member 20 and the rubber roll 40 is transmitted to the metallic elastic outer cylinder 50, so that it rotates about its own center axis while being supported by the eccentric side plates 53, 54 rotatably.

Note that the above-mentioned arrangement may be modified so that under unloaded condition, the rubber roll 40 does not make contact with the metallic elastic outer cylinder 50 so as to produce a clearance between the outer circumferential surface 40A of the rubber roll 40 and the inner circumferential surface 50A of the outer cylinder 50. Owing to this arrangement, it becomes easy to assemble the inner cylinder member 20 equipped with the rubber roll 40 into the metallic elastic outer cylinder 50.

Additionally, in order to ensure a transmitting of rotating power between the rubber roll 40 and the metallic elastic outer cylinder 50 by friction, the rubber roll 40 may be provided, on the outer circumferential surface 40A, with circumferential or spiral grooves.

Figure 4:
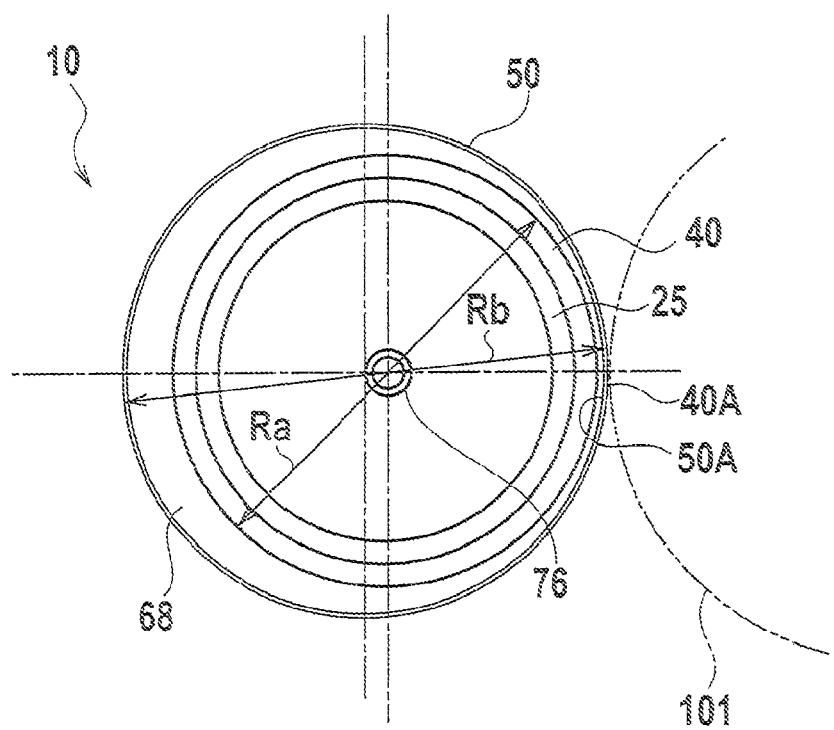
FIG. 4 is a sectional view taken along a line IV-IV of FIG. 3.

The eccentric side plates 53, 54 are respectively connected to the operating-side bearing part 26 and the driving-side bearing part 27 through whirl-stop parts 57, 58 for preventing the plates 53, 54 from being whirled. Owing to the provision of the whirl-stop parts 57, 58, an eccentric direction of the eccentric side plates 53, 54 in relation to the inner cylinder member 20 and the rubber roll 40 can be determined. As shown in FIG. 4, this eccentric direction is established so that one side of the sheet or film-forming roll (touch roll) 10 opposing the main roll 101 coincides with an eccentricity closer side (right in FIG. 4). Namely, there is established such an eccentric direction that the center "Ca" of the inner cylinder member 20 gets closer to the main roll 101 in comparison with the centers "Cb" of the eccentric side plates 53, 54 (see FIG. 5).

Consequently, the rubber roll 40 abuts on the inner circumferential surface 50A of the metallic elastic outer cylinder 50, on a cylinder's side pressed on the main roll 101 (right of FIG. 4).

Figure 5:
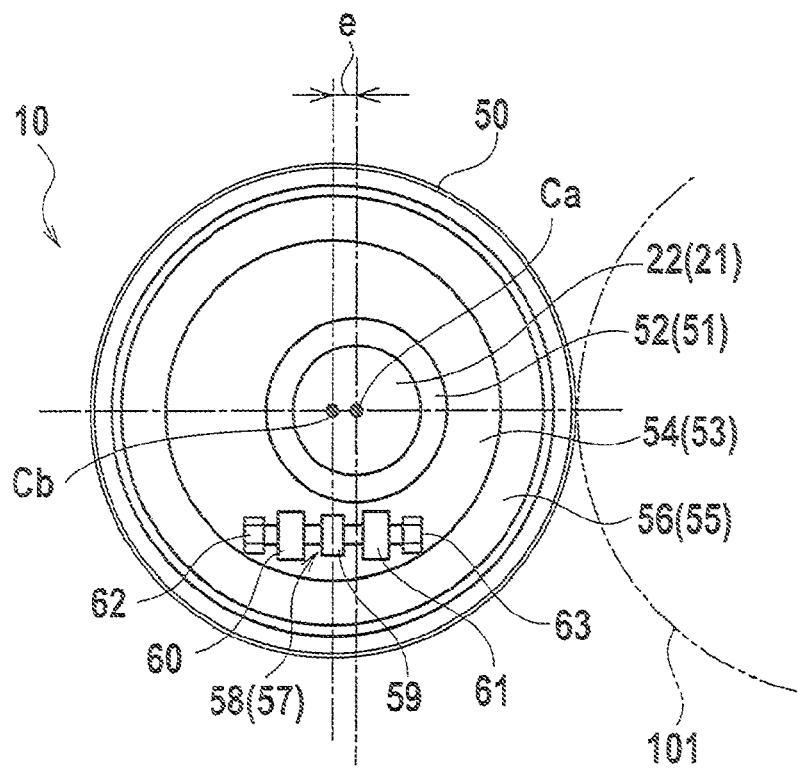
FIG. 5 is a sectional view taken along a line V-V of FIG. 3.

As shown in FIG. 5, the whirl-stop part 58 (57) comprises a projecting piece 59 fixed on the eccentric side plate 54 (53) and adjustment screws 62, 63 screwed into attachment pieces 60, 61 fixed on the driving-side bearing part 27 (the operating-side bearing part 26). The eccentric side plates 53, 54 are prevented from rotating since the adjustment screws 62, 63 pinch each projecting piece 59 from both sides thereof.

Further, by adjusting penetration depths of the adjustment screws 62, 63, a pinching position of the projecting piece 59 can be modified in a circumferential direction (i.e. clockwise direction and counter-clockwise direction) of the eccentric side plate 54 (53). Thus, it is possible to set respective whirl-stop positions of the eccentric side plates 53, 54 variably. It means that an eccentric amount of the metallic elastic outer cylinder 50 pressed on the main roll 101 can be adjusted in increasing and decreasing.

A seal member 64 is fitted between the axial member 21 of the inner cylinder member 20 and the eccentric side plate 53, while another seal member 65 is fitted between the axial member 22 of the inner cylinder member 20 and the eccentric side plate 54. Similarly, a seal member 66 is fitted between the eccentric side plate 53 and the metallic elastic outer cylinder 50, while another seal member 67 is fitted between the eccentric side plate 54 and the metallic elastic outer cylinder 50. Thus, the interior 68 of the metallic elastic outer cylinder 50 is formed to have a fluid-tight structure.

In a center bore 69 of the axial member 21 on the operating side, a heat-medium supply channel 71 and a heat-medium drain channel 72 are defined by a tube 70. The heat-medium supply channel 71 and the heat-medium drain channel 72 are communicatively connected to a cooling-water (coolant) supply nipple 74 and a cooling-water (coolant) drain nipple 75 (both nipples on a fixed side) through a double-structure rotary joint 74 fitted to an axial end of the axial member 21, respectively (see FIG. 2).

The heat-medium supply channel 71 is communicated with heat-medium supply holes 77, 78 formed in the axial member 22 on the driving side through a tube 76 or the like bridging between the flange parts 23, 24 at the center part of the inner cylinder member 20. The heat-medium drain channel 72 is communicated with a heat-medium drain hole 79 formed in the axial member 21.

Consequently, cooling water is supplied from the cooling-water supply nipple 74 into the interior 68 of the metallic elastic outer cylinder 50 through the rotary joint 73, the heat-medium supply channel 71, the tube 76 and the heat-medium supply holes 77, 78, in order. Thus, the interior 68 of the metallic elastic outer cylinder 50 is filled up with the cooling water. The cooling water in the interior 68 flows from the heat-medium drain hole 79 into the heat-medium drain channel 72, the rotary joint 73 and the cooling-water drain nipple 75 in order and is discharged outside the nipple 75.

The above-constructed sheet or film-forming roll 10 is driven in rotation about its own center axis (rotation about the center "Ca" as a rotating center) by the electric motor 32 on condition that the rubber roll 40 integrated with the inner cylinder member 20 is born by the operating-side bearing part 26 and the driving-side bearing part 27.

Since the outer circumferential surface 40A of the rubber roll 40 abuts on the inner circumferential surface 50A of the metallic elastic outer cylinder 50, the rotation of the inner cylinder member 20 and the rubber roll 40 is transmitted to the metallic elastic outer cylinder 50 due to friction between respective contact portions of the roll 40 and the cylinder 50. Consequently, the metallic elastic outer cylinder 50 is rotatably supported by the eccentric side plates 53, 54 and rotates about its own center axis while the rubber roll 40 is abutting on an inside of the cylinder 50.

As mentioned above, since the sheet or film-forming roll 10 includes the metallic elastic outer cylinder 50 supported, on its inside, by the rubber roll 40, the metallic elastic outer cylinder 50 can be elastically and appropriately deformed while following the outer circumferential surface of the main roll 101 due to a pressure load applied on it by the metallic elastic outer cylinder 50. Thus, the sheet or film-forming roll of this embodiment can form a thin sheet film in comparison with a conventional sheet or film-forming roll where a metallic outer cylinder is formed with only a thin-walled structure.

Further, if only connecting the electric motor 22 to the axial member 22 supported by the driving-side bearing part 27 as well as the conventional sheet or film-forming roll, then the sheet or film-forming roll 10 can be rotated by a driving mechanism similar to the conventional driving mechanism. Thus, the sheet or film-forming roll 10 as it is can be employed for an existing general sheet or film-forming machine without complicating a structure of driving system.

Additionally, since the eccentric supporting part is formed by the eccentric side plates 53, 54 forming lateral end plates of the metallic elastic outer cylinder 50, both maintenance/inspection and parts replacement for the ball bearings 51, 52, 55, 56 and the seal members 64, 65, 66, 67 can be performed on the lateral sides of the roll without disassembling the roll entirely, which is superior in maintainability.

Additionally, as the adjustment screws 62, 63 of the whirl-stop parts 57, 58 allow an eccentricity amount of the metallic elastic outer cylinder 50 to be adjusted in increasing and decreasing, it is possible to perform an adjustment to compensate an abrasion of the rubber roll 40 with ease. In detail, even if a pressure distribution of supporting from the inside goes wrong due to the abrasion of the rubber roll 40, an adjustment to cancel such a geometrical distortion can be accomplished even during the operation.

In the sheet or film-forming roll 10 constructed above, if radial loads are applied on the operating-side bearing part 26 and the driving-side bearing part 27 each at two positions mutually-biased in the axial direction (i.e. direction of a generating line), then, the cylindrical member 25 can be curved with its body arched backward. Through the use of this behavioral model, the distribution of inside pressure in the axial direction can be set variably, attaining "crowning" characteristics. In connection, if making the eccentric side plates 53, 54 from hard rubber-like material, the above advantage would be more effective.

In this embodiment, the inner cylinder member 20 is formed as a hollow assembly of the axial members 21, 22 and the cylindrical member 25. However, the inner cylinder member 20 may be modified to be a solid body. In connection, the inner cylinder member 20 may be provided by an integral body where the axial members 21, 22 and the cylindrical member 25 are united. Note that the inner cylinder member 20 is not limited to be a cylindrical body only. The same functions could be accomplished even if a solid body.

$2^{nd}$. Embodiment

Figure 2:
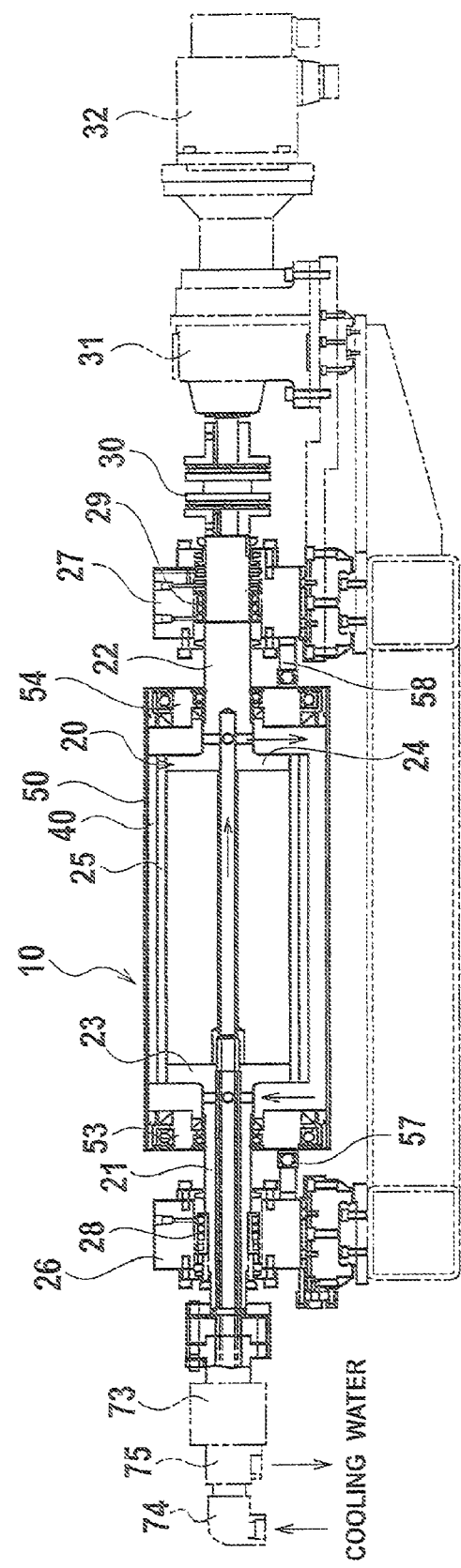
FIG. 2 is a sectional view showing a sheet or film-forming apparatus where the sheet or film-forming rolls of the present invention are incorporated, in accordance with a first embodiment view of the invention.
Figure 3:
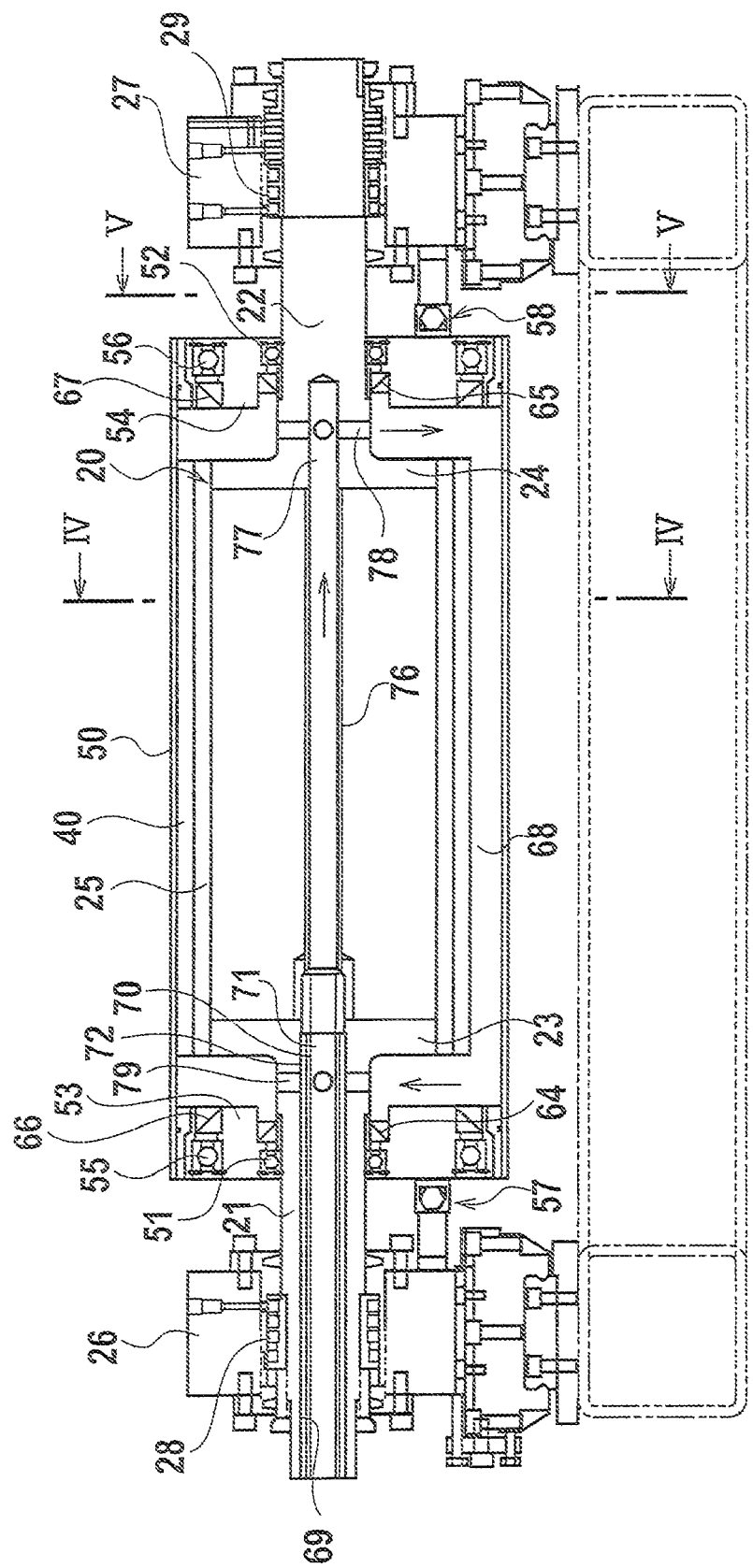
FIG. 3 is an enlarged view of a substantial part of a sheet or film-forming roll of FIG. 2.
Figure 6:
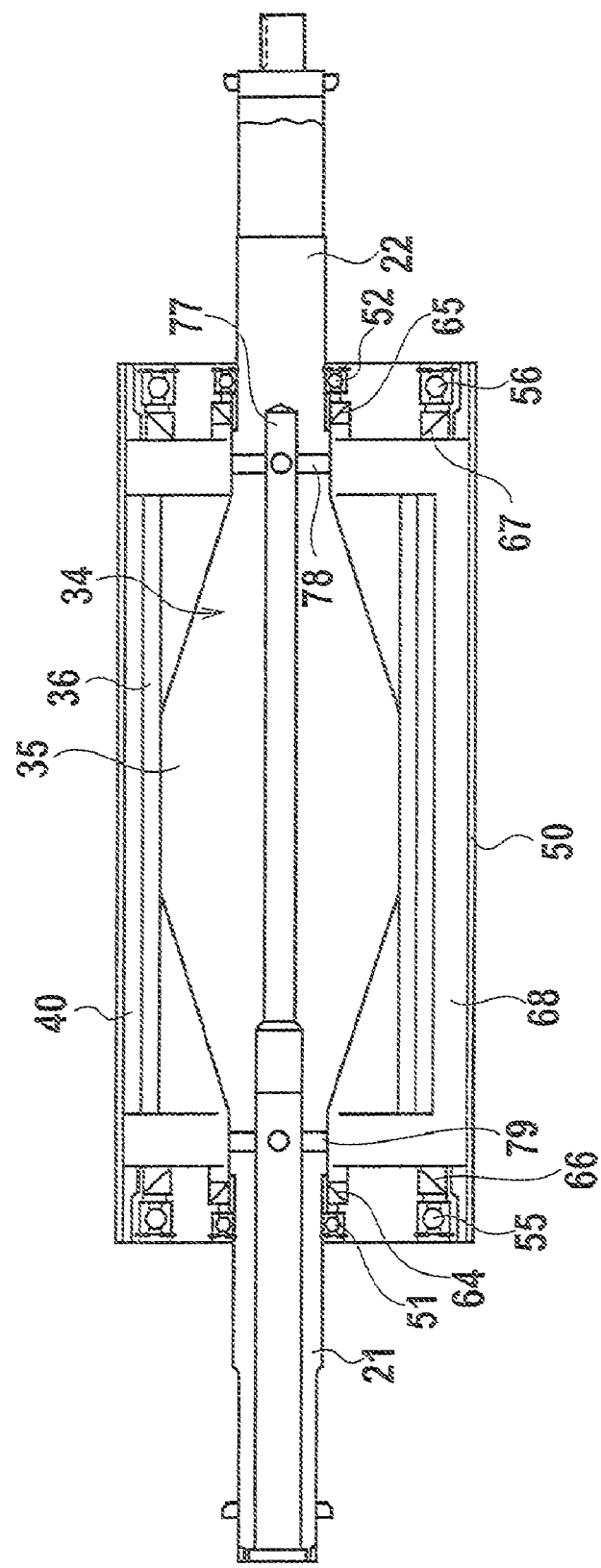
FIG. 6 is a sectional view of a sheet or film-forming roll in accordance with a second embodiment view of the invention.

The sheet or film-forming roll in accordance with the second embodiment of the present invention will be described with reference to FIG. 6. In FIG. 6, elements corresponding to the elements of FIGS. 2 and 3 are indicated with the same reference numerals as those of FIGS. 2 and 3 respectively and their explanations are eliminated.

According to the second embodiment, an axial member 34 is provided, on both ends thereof, with axial parts 21, 22. The axial parts 21, 22 of the axial member 34 are rotatably supported by the operating-side bearing part 26 and the driving-side bearing part 27 respectively, as similar to the previous embodiment. The axial member 34 is provided, at its axial intermediate portion, with a large diametrical part 35 in the interior 68.

An inner cylinder member 36 in the form of a cylinder opening at both ends thereof is connected to the large diametrical part 35 by welding etc. That is, the inner cylinder member 36 is connected, at the axial intermediate portion, with the axial member 34, representing a so-called "center-loading" structure. The rubber roll 40 is fitted in lamination to the whole outer circumferential surface of the inner cylinder member 36.

Except the above-mentioned structure, the sheet or film-forming roll of the second embodiment is similar to that of the previous embodiment.

In the embodiment, although the inner cylinder member 36 and the rubber roll 40 are rigidly connected to the axial member 34 only at the axial intermediate portion, respective axial ends of the inner cylinder member 36 and the rubber roll 40 constitute free ends. Therefore, a pressure of the rubber roll 40 to support an inside of the metallic elastic outer cylinder 50 is enhanced in the axial intermediate portion, in comparison with pressures applied on the axial ends. Thus, according to the second embodiment, it is possible to provide the sheet or film-forming roll having "crowning" characteristics in addition to the effect of the first embodiment.

3$^{rd}$. Embodiment

Figure 7:
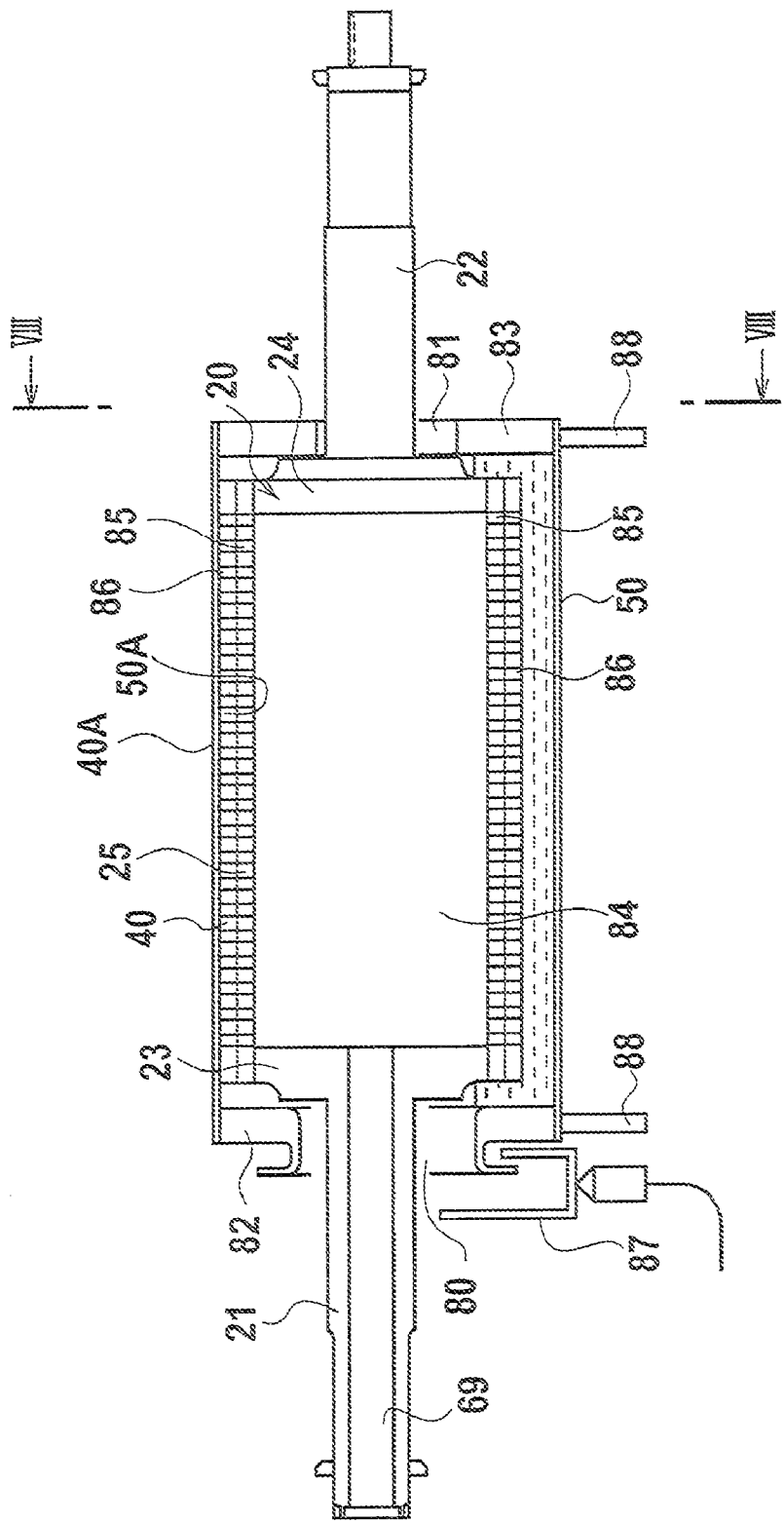
FIG. 7 is a sectional view of a sheet or film-forming roll in accordance with a third embodiment view of the invention.
Figure 8:
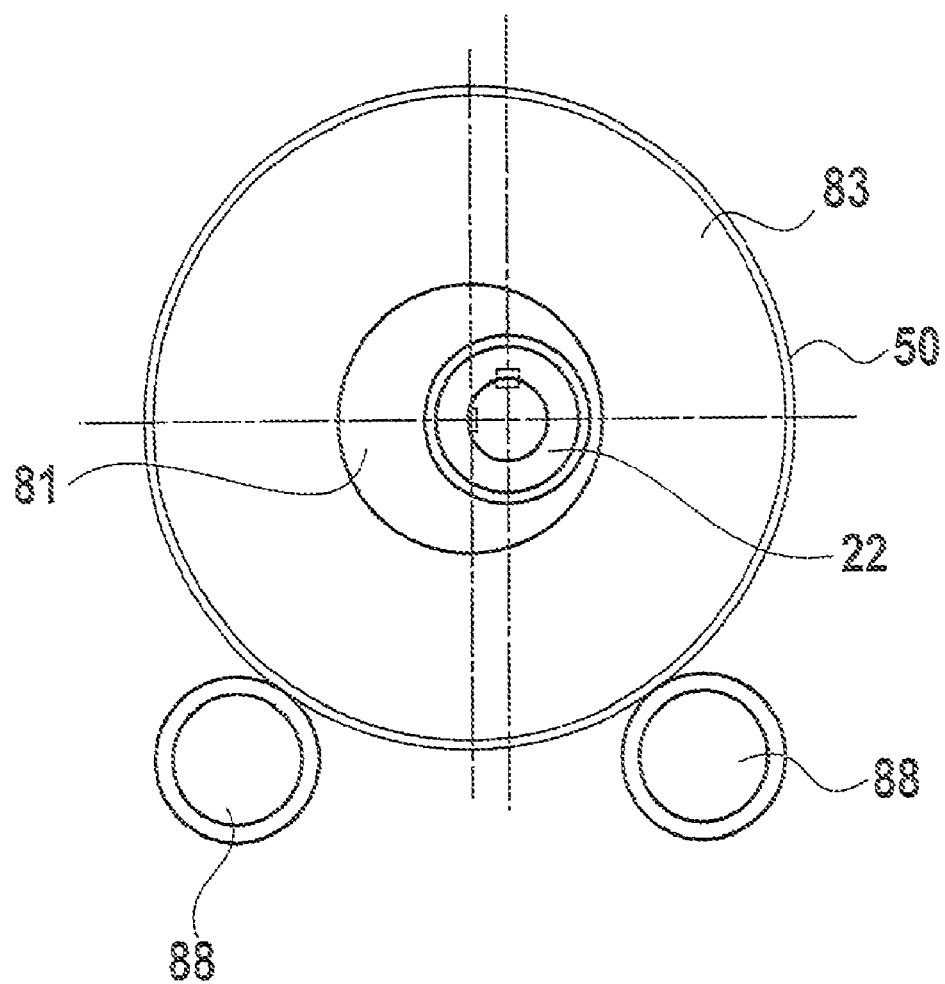
FIG. 8 is a sectional view taken along a line VIII-VIII of FIG. 7.
Figure 9:
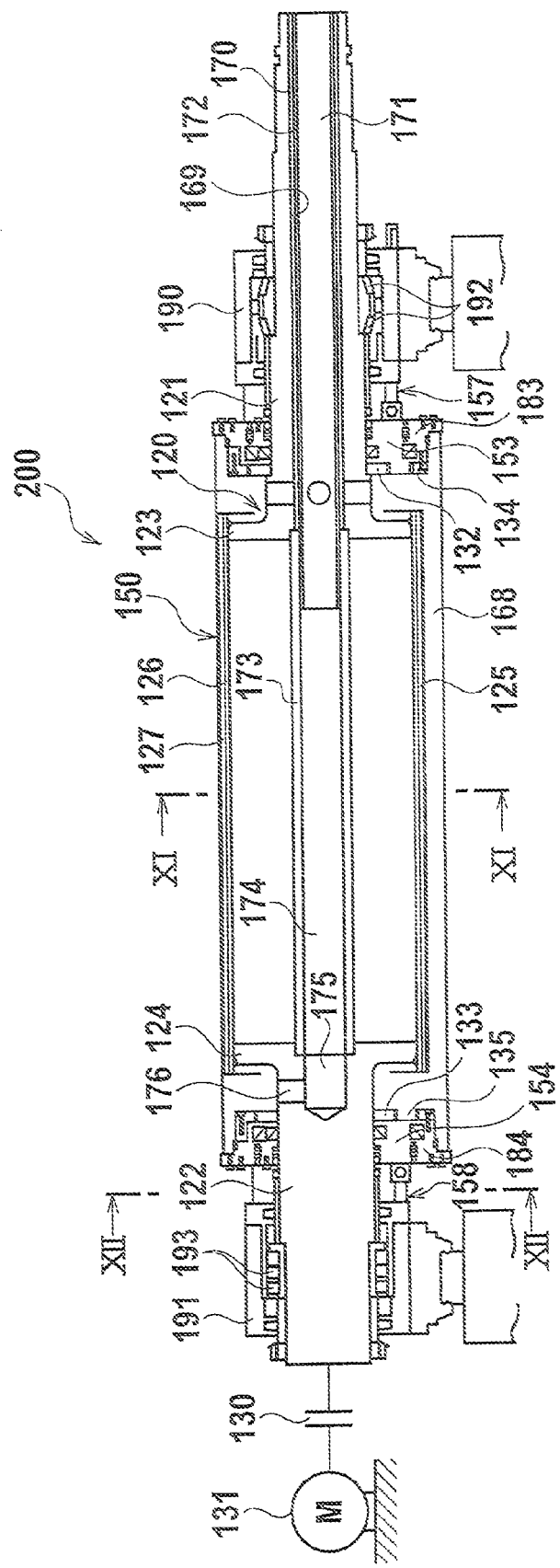
FIG. 9 is a sectional view showing a sheet or film-forming apparatus where the sheet or film-forming rolls of the present invention are incorporated, in accordance with a fourth embodiment view of the invention.
Figure 10:
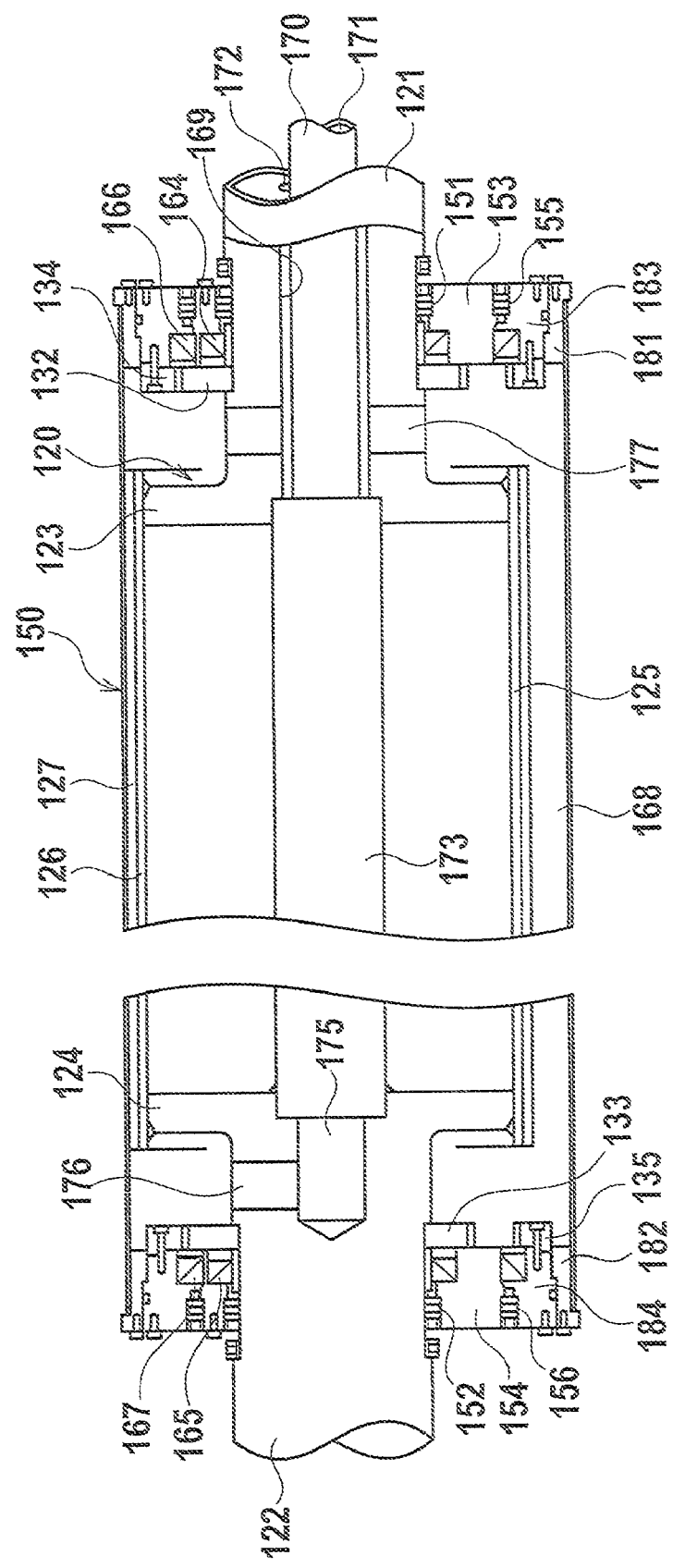
FIG. 10 is an enlarged view of a substantial part of a sheet or film-forming roll of FIG. 9.

The sheet or film-forming roll in accordance with the third embodiment of the present invention will be described with reference to FIGS. 7 and 8. In FIGS. 7 and 8, elements corresponding to the elements of FIGS. 2 to 5 are indicated with the same reference numerals as those of FIGS. 2 to 5 respectively and their explanations are eliminated.

In this embodiment, side plates 82, 83 having center openings 80, 81 are fixed to both ends of the metallic elastic outer cylinder 50, respectively.

The axial members 21, 22 of the inner cylinder member 20 penetrate through the center openings 80, 81 of the side plates 82, 83 in a so-called "play-fitting" condition (free state), respectively. Thus, an assembly of the metallic elastic outer cylinder 50 and the side plated 82, 83 are eccentrically arranged in relation to the rubber roll 40. As similar to the previously-mentioned embodiments, the inner circumferential surface 50A of the metallic elastic outer cylinder 50 abuts on the outer circumferential surface 40A of the rubber roll 40. The metallic elastic outer cylinder 50 is rotatably supported by a plurality of external rollers 88 abutting on the outer circumferential surface of the metallic elastic outer cylinder 50

According to the embodiment, the axial member 21 of the inner cylinder member 20 has a center bore 69 opening at an inside space 84 of the inner cylinder member 20. In this embodiment, the center bore 69 in itself constitutes a heat-medium supply channel. A number of heat-medium passage holes 85, 86 are formed so as to penetrate the cylindrical member 25 of the inner cylinder member 20 and the rubber roll 40, respectively.

Cooling water is supplied into the inside space 84 of the inner cylinder member 20. Thereafter, the cooling water flows into the interior 68 of the metallic elastic outer cylinder 50 through the heat-medium passage holes 85, 86 and accumulates in a lower part of the interior 68 due to gravity. The cooling water overswells outside through the center opening 80 of the side plate 82 forming a side opening of the metallic elastic outer cylinder 50 and is collected by an outside cooling-water recovery cup 87.

Also in this embodiment, the inner cylinder member 20 and the integrated rubber roll 40 are rotated about their center axes by the electric motor. Since the outer circumferential surface 40A of the rubber roll 40 abuts on the inner circumferential surface 50A of the metallic elastic outer cylinder 50, the rotation of the inner cylinder member 20 and the rubber roll 40 is transmitted to the metallic elastic outer cylinder 50 due to friction between their contact portions. Consequently, the metallic elastic outer cylinder 50 rotates about its own center axis while the rubber roll 40 is abutting on an inside of the cylinder 50.

In this way, the third embodiment of the invention can bring about an effect similar to that of the first embodiment.

As mentioned above, in common with the sheet or film-forming rolls in accordance with the first embodiment to the third embodiment, the rubber roll is fitted (concentrically) to the outer circumferential surface of the inner cylinder rotatably supported, through its axial parts on both ends, by the bearing parts, and the metallic elastic outer cylinder is arranged eccentrically in relation to the rubber roll. Accordingly, with the operational connection between the axial part of the inner cylinder member and the electric motor, the rotation of the inner cylinder member can be transmitted to the metallic elastic outer cylinder 50 due to friction between respective contact portions of the rubber roll and the metallic elastic outer cylinder 50. Consequently, even if driven in rotation, it is possible to employ the sheet or film-forming roll of the present invention as it is, for an existing general sheet or film-forming apparatus without making the driving system complicated in structure.

4$^{th}$. Embodiment

A sheet or film-forming roll in accordance with the fourth embodiment of the present invention will be described with reference to FIGS. 9 to 12.

The sheet or film-forming roll 200 includes an inner cylinder member 120 and a metallic elastic outer cylinder (elastic outer cylinder member) 150.

The inner cylinder member 120 comprises an axial member 121 on an operating side (left of FIGS. 9 and 10), an axial member 122 on a driving side (right of FIGS. 9 and 10) and an elastic cylindrical body 125 fixed to flange parts 123, 124 which are formed integrally with respective ends of the axial members 121, 122, respectively. The axial members 121, 122 are arranged concentrically to each other. The elastic cylindrical body 125 has its both ends fixed to the flange parts 123, 124 respectively and is arranged concentrically to the axial members 121, 122.

The elastic cylindrical body 125 comprises a metallic cylindrical member 126 having its both ends welded to the flange parts 123, 124 respectively and a rubber roll 127 fitted to an outer circumferential surface of the metallic cylindrical member 126. The rubber roll 127 is made from rubber-like elastic material, for example, silicon rubber, ethylene-propylene rubber, etc. The rubber roll 40 is fitted in lamination to a whole outer circumferential surface of the metallic cylindrical member 126.

The inner cylinder member 120 is rotatably supported by an "operating-side" bearing part 190 and a "driving-side" bearing part 191 through the axial members (axial parts) 121, 122, respectively. Thus, the inner cylinder member 120 can rotate about its own center axis. In other words, the operating-side bearing part 190 and the driving-side bearing part 191 rotatably support the axial members 121, 122 on both ends of the inner cylinder member 120 through bearing members 192, 193, respectively.

The axial member 122 on the driving side is operatively connected to an electric motor 131. With this arrangement, the inner cylinder member 120 is operatively connected to the electric motor 131 and rotated by the same 131.

The axial members 121, 122 of the inner cylinder member 120 rotatably support disc-shaped eccentric side plates 153, 154 through ball bearings 151, 152, respectively. Respective centers "Cb" of the eccentric side plates 153, 154 are eccentrically positioned in relation to a center "Ca" of the inner cylinder member 120 by a shift length "e" (see FIG. 12).

The metallic elastic outer cylinder 150 is in the form of a cylindrical body of sheet metal, such as stainless steel, exhibiting a thin-walled structure having flexibility. Annular end members 181, 182 are attached to both ends of the metallic elastic outer cylinder 150 integrally. Ring-shaped gear attachment members 183, 184 are integrally attached to respective inner sides of the end members 181, 182, respectively.

The eccentric side plates 153, 154 rotatably support, at their outer circumferential parts, both ends of the gear attachment members 183, 184 through ball bearings 155, 156, respectively. As a result, both ends of the metallic elastic outer cylinder 150 are rotatably supported by the eccentric side plates 153, 154 owing to the ball bearings 155, 156 through the end members 181, 182 and the gear attachment members 183, 184, respectively.

The metallic elastic outer cylinder 150 has an inner diameter "Rb" (see FIG. 11) thoroughly-larger than an outer diameter "Ra" of the rubber roll 127 and accommodates the rubber roll 127 in an interior 168 of the cylinder 150. Due to this eccentric arrangement of the outer cylinder 150 in relation to the rubber roll 127, an inner circumferential surface 150A of the outer cylinder 150 comes in contact with an outer circumferential surface 127A of the rubber roll 127 on a closer side (right of FIG. 11) of eccentricity.

Note that the above-mentioned arrangement may be modified so that under unloaded condition, the outer circumferential surface 127A of the rubber roll 127 does not abut on the inner circumferential surface 150A of the metallic elastic outer cylinder 150 to produce a clearance between the outer circumferential surface 127A of the rubber roll 127 and the inner circumferential surface 150A of the outer cylinder 150. Alternatively, the arrangement may be modified so that an elastic deformation of the metallic elastic outer cylinder 150 in contact with the main roll 101 causes such a contact between the outer circumferential surface 127A of the rubber roll 127 and the inner circumferential surface 150A of the outer cylinder 150. Owing to these modifications, it becomes easy to assemble the inner cylinder member 120 equipped with the rubber roll 127 into the metallic elastic outer cylinder 150.

Inner gears (pinions) 132, 133 are fixed to outer circumferential parts of the axial members 121, 122 of the inner cylinder member 120, respectively. While, ring-shaped outer gears 134, 135 are respectively fixed to the gear attachment members 183, 184 integrated with the metallic elastic outer cylinder 150, concentrically with the same cylinder 150. The inner gears 132, 133 mesh with the outer gears 134, 135 on a closer side (right of FIG. 11) of eccentricity, respectively. With this engagement, the rotations of the axial members 121, 122, namely, the rotation of the inner cylinder member 120 is transmitted to the metallic elastic outer cylinder 150.

Note that instead of an inside arrangement mentioned above, the inner gears 132, 133 and the outer gears 134, 135b may be arranged outside the interior 168 of the metallic elastic outer cylinder 150 in the modification.

Assume that "Za" denotes the number of teeth of the inner gear 132 (133), "Zb" the number of teeth of the outer gear 134 (135), "Ra" an outer diameter of the rubber roll 127, and "Rb" denotes an inner diameter of the metallic elastic outer cylinder 150. In this case, if the numbers of teeth are determined so as to meet a condition of "Za=Zb(Rb/Ra)", then a peripheral velocity of the outer circumferential surface of the rubber roll 127 becomes equal to a peripheral velocity of the inner circumferential surface of the metallic elastic outer cylinder 150; so that it is forcibly rotated without producing any slip between the outer circumferential surface of the rubber roll 127 and the inner circumferential surface of the metallic elastic outer cylinder 150.

Figure 11:
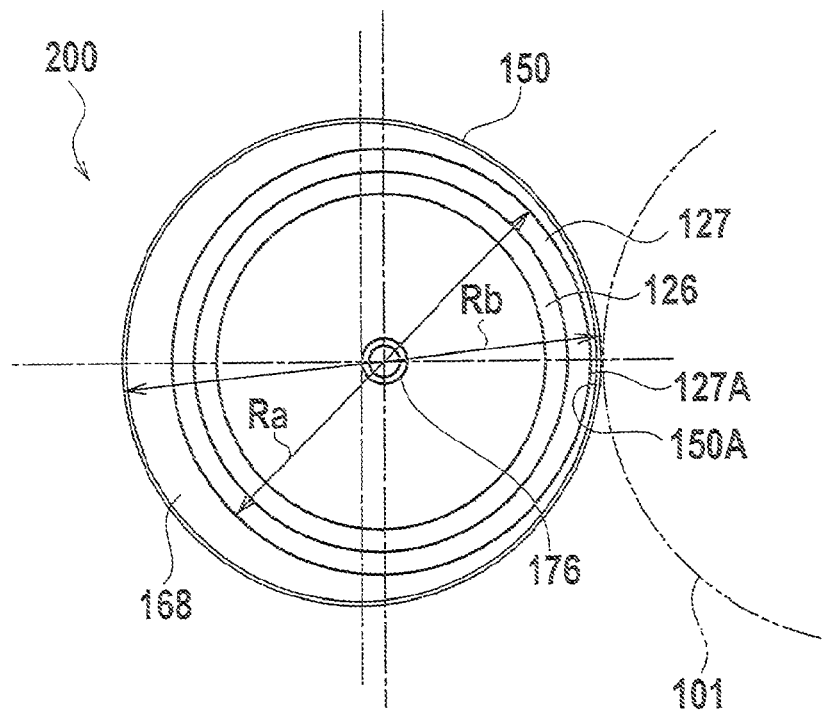
FIG. 11 is a sectional view taken along a line XI-XI of FIG. 9.

The eccentric side plates 153, 154 are respectively connected to an "operating-side" bearing part 190 and a "driving-side" bearing part 191 through whirl-stop parts 157, 158 for preventing the plates 153, 154 from being whirled. Owing to the provision of the whirl-stop parts 157, 158, an eccentric direction of the eccentric side plates 153, 154 in relation to the inner cylinder member 120 and the rubber roll 127 can be determined. As shown in FIG. 11, this eccentric direction is established so that one side of the sheet or film-forming roll (touch roll) 110 opposing the main roll 101 coincides with an eccentricity closer side (right in FIG. 11). Namely, there is established such an eccentric direction that the center "Ca" of the inner cylinder member 120 gets closer to the main roll 101 in comparison with the centers "Cb" of the eccentric side plates 153, 154 (see FIG. 12).

Consequently, the rubber roll 127 abuts on the inner circumferential surface 150A of the metallic elastic outer cylinder 150, on a cylinder's side pressed on the main roll 101 (right of FIG. 11).

Figure 12:
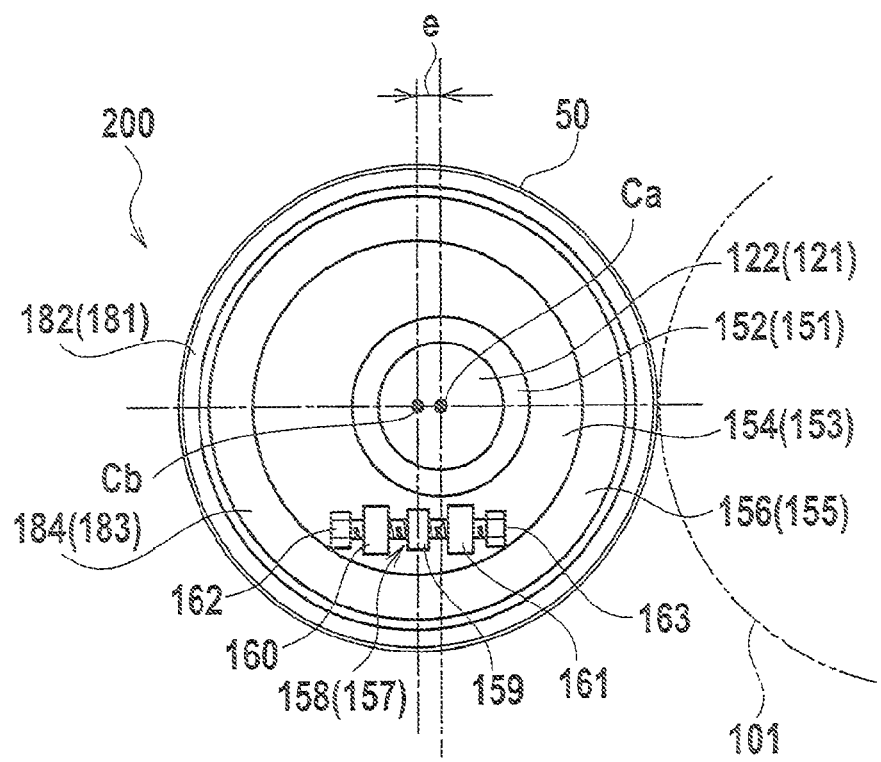
FIG. 12 is a sectional view taken along a line XII-XII of FIG. 9.

As shown in FIG. 12, the whirl-stop part 158 (157) comprises a projecting piece 159 fixed on the eccentric side plate 154 (153) and adjustment screws 162, 163 screwed into attachment pieces 160, 161 fixed on the driving-side bearing part 191 (the operating-side bearing part 190). The eccentric side plates 153, 154 are prevented from rotating since the adjustment screws 162, 163 pinch each projecting piece 159 from both sides thereof.

Further, by adjusting penetration depths of the adjustment screws 162, 163, a pinching position of the projecting piece 159 can be modified in a circumferential direction (i.e. clockwise direction and counter-clockwise direction) of the eccentric side plate 154 (153). Thus, it is possible to set respective whirl-stop positions of the eccentric side plates 153, 154 variably. It means that an eccentric amount of the metallic elastic outer cylinder 150 pressed on the main roll 101 can be adjusted in increasing and decreasing.

A seal member 164 is fitted between the axial member 121 of the inner cylinder member 120 and the eccentric side plate 153, while another seal member 165 is fitted between the axial member 122 of the inner cylinder member 120 and the eccentric side plate 154. Similarly, a seal member 166 is fitted between the eccentric side plate 153 and the gear attachment member 183 of the metallic elastic outer cylinder 150, while another seal member 167 is fitted between the eccentric side plate 154 and the gear attachment member 184 of the metallic elastic outer cylinder 150. Thus, the interior 168 of the metallic elastic outer cylinder 150 is formed to have a fluid-tight structure.

The axial member 121 on the operating side is formed with a center bore 169. A tube 170 is inserted into the center bore 169. A heat-medium supply channel 171 and a heat-medium drain channel 172 are defined inside and outside the tube 170, respectively. The heat-medium supply channel 171 and the heat-medium drain channel 172 are communicatively connected to a not-shown cooling-water supply nipple and a not-shown cooling-water drain nipple (both on a fixed side) through a double-structure rotary joint (not shown) fitted to an axial end of the axial member 121, respectively.

The heat-medium supply channel 171 is communicated with one side (left side) of the interior 168 of the metallic elastic outer cylinder 150 through an in-tube passage 174 in a tube 173 that bridges between the flange parts 123, 124 and also extends, at the center part of the inner cylinder member 120, along the axial direction and additionally, heat-medium supply holes 175, 176 formed in the axial member 122 on the driving side. The heat-medium drain channel 172 is communicated with the other side (right side) of the interior 168 of the metallic elastic outer cylinder 150 through heat-medium drain holes 177 formed in the axial member 121.

The cooling water is supplied from the cooling-water supply nipple (not shown) into the interior 168 of the metallic elastic outer cylinder 150 through the rotary joint (not shown), the heat-medium supply channel 171, the in-tube passage 174 and the heat-medium supply holes 175, 176, in order. Thus, the interior 168 of the metallic elastic outer cylinder 150 is filled up with the cooling water. The cooling water in the interior 168 flows from one side toward the other side, enters the heat-medium drain channel 172 via the heat-medium drain holes 177 and flows in the rotary joint and the cooling-water drain nipple. Then, the cooling water is discharged outside the nipple.

The above-constructed sheet or film-forming roll 200 is driven in rotation about its own center axis (rotation about the center "Ca" as a rotating center) by the electric motor 131 on condition that the inner cylinder member 120 is born by the operating-side bearing part 190 and the driving-side bearing part 191.

The rotation of the inner cylinder member 120 is transmitted to the metallic elastic outer cylinder 150 due to the engagement of the inner gears 132, 133 with the outer gears 134, 135. Consequently, the metallic elastic outer cylinder 150 is rotatably supported by the eccentric side plates 153, 154 and rotates about its own center axis while the rubber roll 127 is abutting on an inside of the cylinder 150.

Since the metallic elastic outer cylinder 150 is driven by means of gears forcibly, it rotates in sync with the rotation of the inner cylinder member 120 certainly, so that no slip is produced between the metallic elastic outer cylinder 150 and the rubber roll 127.

As mentioned above, since the sheet or film-forming roll 200 includes the metallic elastic outer cylinder 150 supported, on its inside, by the rubber roll 127, the metallic elastic outer cylinder 150 can be elastically and appropriately deformed while following the outer circumferential surface of the main roll 101 due to a pressure load applied on it by the metallic elastic outer cylinder 150. Thus, the sheet or film-forming roll of this embodiment can form a thin sheet film in comparison with a conventional sheet or film-forming roll where a metallic outer cylinder is formed with only a thin-walled structure.

Further, if only connecting the electric motor 131 to the axial member 122 supported by the driving-side bearing part 127 as well as the conventional sheet or film-forming roll, then the sheet or film-forming roll 200 can be rotated by a driving mechanism similar to the conventional driving mechanism. Thus, the sheet or film-forming roll 200 can be employed as it is for an existing general sheet or film-forming machine without complicating a structure of driving system.

Additionally, since the eccentric supporting part is formed by the eccentric side plates 153, 154 forming lateral end plates of the metallic elastic outer cylinder 150, both maintenance/inspection and parts replacement for the ball bearings 151, 152, 155, 156 and the seal members 164, 165, 166, 167 can be performed on the lateral sides of the roll without disassembling the roll entirely, which is superior in maintainability.

Additionally, as the adjustment screws 162, 163 of the whirl-stop parts 157, 158 allow an eccentricity amount of the metallic elastic outer cylinder 150 to be adjusted in increasing and decreasing, it is possible to perform an adjustment to compensate an abrasion of the rubber roll 127 with ease. In detail, even if a pressure distribution of supporting from the inside goes wrong due to the abrasion of the rubber roll 127, an adjustment to cancel such a geometrical distortion can be accomplished even during the operation.

It should be noted that the rubber roll 127 of the inner cylinder member 120 is not necessarily fundamental to the sheet or film-forming roll of the present invention but an elective element. For the forming of a sheet film which is not much thin, the elastic cylindrical body 125 may be formed by only a metallic cylinder deformable elastically.

As mentioned above, since the sheet or film-forming roll of the present invention in accordance with the fourth embodiment of the present invention has the metallic elastic outer cylinder arranged eccentrically to the inner cylinder member supported through its axial parts on both ends by the bearing parts rotatably, an operational connection between the electric motor and the axial parts of the inner cylinder member allows its rotation to be transmitted to the metallic elastic outer cylinder through the above-mentioned gear mechanism.

Consequently, the sheet or film-forming roll of the present invention, even if it is driven in rotation, can be used as it is, for an existing general sheet or film-forming apparatus without making the driving system complicated in structure, whereby the metallic elastic outer cylinder can be rotated at a desired speed certainly.

This application is based upon the Japanese Patent Application No. 2005-275602, filed on Sep. 22, 2005, and No. 2005-376468, filed on Dec. 27, 2006, the entire content of which are incorporated by reference herein.

Although the present invention has been described above by reference to certain embodiments of the invention, this invention is not limited to these embodiments and modifications will occur to those skilled in the art, in light of the teachings. The scope of the invention is defined with reference to the following claims.

What is claimed is:

1. A sheet or film-forming roll comprising:
an inner cylinder member having an elastic cylindrical body and axial parts extending along a center axis of the elastic cylindrical body, the inner cylinder member being rotatably supported through the axial parts;
an elastic outer cylinder member arranged eccentrically to the inner cylinder member so that an inner circumferential surface of the elastic outer cylinder member comes into contact with a part of the outer circumferential surface of the inner cylinder member, the elastic outer cylinder member being provided with a thin-walled structure and made from metal;
a gear mechanism for transmitting rotating torque of the inner cylinder member to the elastic outer cylinder member when the inner cylinder member is rotated;
a pair of eccentric side plates fitted to the axial parts of the inner cylinder member rotatably to support the elastic outer cylinder member rotatably; and
whirl-stop parts for preventing the side plates from being whirled, each of which has a mechanism capable of setting a whirl-stop position of the side plate in a circumferential direction thereof variably.

2. The sheet or film-forming roll of claim 1, wherein the gear mechanism includes inner gears attached to the axial parts of the inner cylinder member and ring-shaped outer gears attached to the metallic elastic outer cylinder member to mesh with the inner gears, respectively.

3. The sheet or film-forming roll of claim 1, wherein the elastic cylindrical body is formed by a metallic cylindrical member and a rubber roll fitted to an outer circumferential surface of the cylindrical member and made of rubber-like elastic material, and
an outer circumferential surface of the rubber roll comes in contact with an inner circumferential surface of the elastic outer cylinder member.

* * * * *